W. M. STUART.
Pipe Coupling.
No. 229,771. Patented July 6, 1880.
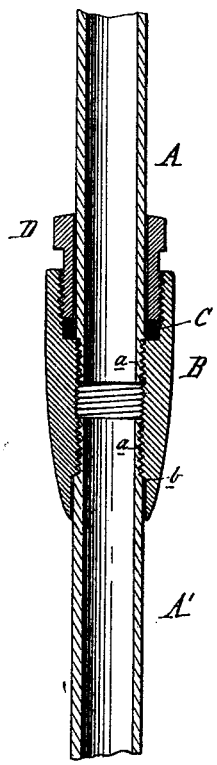

UNITED STATES PATENT OFFICE.

WILLIAM M. STUART, OF QUINCY, MICHIGAN, ASSIGNOR OF ONE-HALF OF HIS RIGHT TO SOMERS S. LELAND, OF SAME PLACE.

PIPE-COUPLING.

SPECIFICATION forming part of Letters Patent No. 229,771, dated July 6, 1880.

Application filed February 2, 1880.

*To all whom it may concern:*

Be it known that I, WILLIAM M. STUART, of Quincy, Branch county, Michigan, have invented a Pipe-Coupling, of which the following is a specification.

My invention relates to improvements in pipe-couplings, and is especially adapted for connecting the joints of pipes in drive-wells, although it may be applied to coupling water, steam, gas, or other pipes; and it consists of a coupling tapering at its lower end, so that it may be easily driven into the earth, and provided with a central threaded portion capable of receiving the screw-threaded ends of the pipes to be joined together, and having an enlarged screw-threaded chamber to receive a suitable packing held in place by a hollow nut, and an enlarged lower chamber embracing the upper portion of the lower pipe below its screw-thread to prevent the breaking of the pipe, as hereinafter more fully set forth.

Heretofore pipes have been joined together by a coupling provided with a central threaded portion engaging with the screw-threaded edge of the pipes to be joined together, the ends of the coupling having enlarged screw-threaded chambers which receive contractible rings screw-threaded at their ends. In my invention I dispense with the contractible rings, taper the lower end of the coupling so that it may be readily driven into the earth, and construct the lower enlarged chamber of the coupling so that it fits around or embraces the external part of the lower pipe below the screw-thread to cause less liability of breakage at the screw-thread, while the enlarged upper chamber affords a seat for the packing to form a water-tight joint and a receptacle for the hollow nut to hold the packing in place.

In the accompanying drawing, which forms a part of this specification, and which shows my invention in longitudinal section, A A' represent two sections of pipe designed to be coupled together, and upon the adjacent ends of which are cut threads *a*.

B represents a coupling-box, the central bore of which is threaded to receive and into which are screwed the ends of the pipes A A'. In one end of this coupling-box the bore is considerably enlarged, and is internally threaded to receive a suitable packing, C, which is compressed by the hollow nut D, through which the pipe A passes. By this manner of construction the threads upon the pipe A are protected, and a perfectly tight connection is formed at that point.

The lower end of the coupling B is made tapering, so as to form no obstruction, or but little, in driving the pipes into the earth, and is provided with an enlarged chamber, *b*, for the reception of the upper part of the lower pipe just below the screw-thread. By this construction the screw-thread is protected, and there is less liability of the pipe being broken at its weakest part—the screw-threaded portion thereof.

What I claim as my invention is—

The combination, with the pipes A A', externally screw-threaded at their ends and the coupling B, tapering at its lower end and provided with a central threaded portion, of an enlarged screw-threaded upper chamber and a lower enlarged chamber embracing the upper part of the unthreaded part of the pipe, packing C, and hollow nut D, substantially as described, and for the purpose set forth.

WILLIAM M. STUART.

Witnesses:
   H. S. SPRAGUE,
   A. BARTHEL.